(12) United States Patent
Djapic et al.

(10) Patent No.: US 11,963,093 B2
(45) Date of Patent: Apr. 16, 2024

(54) DEVICE DISCOVERY USING RADIO DISCOVERY CODES IN A SECURE LOCAL AREA NETWORK

(71) Applicants: KONINKLIJKE KPN N.V., Rotterdam (NL); NEDERLANDSE ORGANISATIE VOOR TOEGEPAST-NATUURWETEN-SCHAPPELIJK ONDERZOEK TNO, s-Gravenhage (NL)

(72) Inventors: Relja Djapic, Delfgauw (NL); Antonius Norp, The Hague (NL); Miodrag Djurica, Rotterdam (NL); Sander De Kievit, Tokyo (JP); Toni Dimitrovski, The Hague (NL)

(73) Assignees: Koninklijke KPN N.V, Rotterdam (NL); Nerlandese Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/274,556

(22) PCT Filed: Sep. 9, 2019

(86) PCT No.: PCT/EP2019/073936
§ 371 (c)(1),
(2) Date: Mar. 9, 2021

(87) PCT Pub. No.: WO2020/053121
PCT Pub. Date: Mar. 19, 2020

(65) Prior Publication Data
US 2022/0060978 A1    Feb. 24, 2022

(30) Foreign Application Priority Data
Sep. 10, 2018 (EP) .................... 18193391

(51) Int. Cl.
*H04W 40/24* (2009.01)
*H04L 67/51* (2022.01)
(Continued)

(52) U.S. Cl.
CPC ............. *H04W 48/18* (2013.01); *H04L 67/51* (2022.05); *H04W 8/005* (2013.01); *H04W 40/246* (2013.01)

(58) Field of Classification Search
CPC ... H04W 48/18; H04W 8/005; H04W 40/246; H04W 4/80; H04L 67/16; H04L 12/4641; H04L 67/18
See application file for complete search history.

(56) References Cited

U.S. PATENT DOCUMENTS

| 2016/0302062 A1 | 10/2016 | Lehtovirta et al. |
| 2017/0372368 A1* | 12/2017 | Kwon ............... G06Q 30/0261 |
| 2018/0115895 A1* | 4/2018 | Lehtovirta ............ H04W 8/005 |

FOREIGN PATENT DOCUMENTS

WO    2018/083298 A1    5/2018

OTHER PUBLICATIONS

Combined PCT International Search Report and Written Opinion, PCT App. No. PCT/EP2019/073936, dated Sep. 20, 2019, 16 pages.
Intel et al. "Inclusion of WLAN direct discovery technologies as an alternative for ProSe Direct Discovery: WLAN technology agnostic part." vol. SA WG2, No. Busan, Korea. Jun. 6, 2017, p. 18-22, p. 41-48.

(Continued)

*Primary Examiner* — Marcus Hammonds
(74) *Attorney, Agent, or Firm* — McDonnell Boehnen Hulbert & Berghoff LLP

(57) ABSTRACT

The service-providing device (11, 18, 19) of the invention is configured to obtain a code associated with the service-providing device, to wirelessly transmit the code, and to receive data from a service-using device (1,2) in response to the wireless transmission. The code does not comprise characteristics of the service-providing device. The service-using device of the invention is configured to receive (Continued)

information about one or more service-providing devices located on a secure local area network (29) over the secure local area network. The information comprises a code for each of the one or more service-providing devices. The service-using device is further configured to select one or more of the received codes, listen for wireless transmission of the selected one or more codes, and transmit data to a device which wirelessly transmitted at least one of the selected one or more codes.

20 Claims, 9 Drawing Sheets

(51) Int. Cl.
*H04W 8/00* (2009.01)
*H04W 48/18* (2009.01)

(56) References Cited

OTHER PUBLICATIONS

"3rd Generation Partnership Project; Technical Specification Group Services and System Aspects; Feasibility Study on LAN Support in 5G (Release 16)". 3GPP TR 22.821. V16.1.0. (Jun. 2018), 52 pages.

"3rd Generation Partnership Project; Technical Specification Group Services and System Aspects; Proximity-based service (ProSe); Stage 2 (Release 14)". 3GPP TS 23.303. V14.1.0. (Dec. 2016), 124 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 16)". 3GPP TS 23.401. V16.0.0. (Sep. 2018), 410 pages.

"3rd Generation Partnership Project; Technical Specification Group Radio Access Network; Evolved Universal Terrestrial Radio Access (E-UTRA); Radio Resource Control (RRC); Protocol specification (Release 8)." 3GPP TS 36.331. V8.20.0. (Jun. 2013), 216 pages.

\* cited by examiner

DEVICE DISCOVERY USING RADIO DISCOVERY CODES IN A SECURE LOCAL AREA NETWORK

CROSS REFERENCE TO RELATED APPLICATIONS

The present application is a national stage entry of, and claims priority to, PCT/EP2019/073936, filed on Sep. 9, 2019, which claims priority to European Patent Application EP 18193391.2, filed in the European Patent Office on Sep. 10, 2018, both of which are hereby incorporated in their entirety herein by reference.

FIELD OF THE INVENTION

The invention relates to a service-using device and a service-providing device.

The invention further relates to a method of discovering a service-providing device and a method of enabling discovery of a service-providing device.

The invention also relates to a computer program product enabling a computer system to perform such methods.

BACKGROUND OF THE INVENTION

Local Area Networks (LANs) are networks that connect devices within a limited area, such as a residence, school, laboratory, university campus or office building. LANs are also limited in scope; only devices that belong to the residence, school, laboratory, university campus or office building are connected to the LAN. In a wired LAN security can be implemented on a physical basis. Devices that can physically connect to the LAN are considered to have access to the LAN, devices that are outside the residence, school, laboratory, university campus or office building cannot connect to the LAN directly and do not have access. A gateway (e.g. a residential gateway) that connects the LAN to a Wide Area Network (such as public fixed or mobile network) implements security measures (e.g. a firewall) to block access to the LAN from devices outside the LAN. In a Wireless LAN, security can be implemented e.g. through password protection. Devices that have a password for the Wireless LAN have access to other devices on the LAN, devices that do not have a password cannot connect to devices on the LAN. Note that a LAN may also be a combination of a wired and wireless LAN.

With the introduction of virtual LANs (VLANs), devices in a LAN no longer have to be located at the same location: some devices on a VLAN may only be able to communicate with each other via an ethernet switch (layer 2) or a router (layer 3) and may even be located in different countries (e.g. different branches of a company), while still being part of the same LAN. Still in a VLAN, the same concept of limitation of scope applies, only specific devices (e.g. devices from the same company) have access to the VLAN; other devices do not have access. In 3GPP TR22.821 v 16.1.0: Feasibility Study on LAN Support in 5G (Release 16) the concept of a 5G LAN is introduced. 5G LANs have similar functionalities to Local Area Networks (LANs) but improved with 5G capabilities (e.g., high performance, long distance access, mobility and security).

Local area networks (LANs) typically include both service-providing devices, e.g. printers, and service-using devices, e.g. mobile phones, tablets and laptops of users. Service-using devices (i.e. discoverers) can find service-providing devices (i.e. discoverees) on their LAN by using one or more discovery protocols, e.g. Link Layer Topology Discovery (LLTD) and Universal Plug & Play (UPnP) discovery. UPnP discovery also works on a VLAN or a 5G LAN.

With the introduction of VLANs and 5G LANs, networks have become and are becoming larger. When networks become larger, finding a device in a LAN no longer implies that this device is nearby. For example, a user can find many printers in a campus LAN, but have no idea yet which of the printers are nearby. On the other hand, there is proximity-based discovery, e.g. Proximity-based Services (ProSe) and Bluetooth discovery. However, ProSe and Bluetooth are less efficient at providing the same amount of information as LAN service discovery mechanisms can (e.g. printer status or media stored on a media server).

SUMMARY OF THE INVENTION

It is a first object of the invention to provide a service-using device, which enables identification of nearby service-providing devices in a large local area network.

It is a second object of the invention to provide a service-providing device, which allows service-using devices to identify nearby service-providing devices in a large local area network.

It is a third object of the invention to provide a method of discovering a service-providing device, which enables identification of nearby service-providing devices in a large local area network.

It is a fourth object of the invention to provide a method of enabling discovery of a service-providing device, which allows service-using devices to identify nearby service-providing devices in a large local area network.

According to the invention, the first object is realized in that the service-using device comprises at least one receiver, at least one transmitter, and at least one processor configured to use said at least one receiver to receive information about one or more service-providing devices located on a secure local area network over said secure local area network, said information comprising a code for each of said one or more service-providing devices, select one or more of said received codes, use said at least one receiver to listen for wireless transmission of said selected one or more codes, and use said at least one transmitter to transmit data to a device which wirelessly transmitted at least one of said selected one or more codes.

Said data is preferably transmitted over said secure local area network. Said secure local area network may be a virtual local area network, in which geographically remote devices are presented as local devices. Said one or more codes are also referred to as "radio discovery codes". Said data may comprise a document to be printed by a printer or a request to receive images from a camera, for example. Said information may comprise a program or a key for generating the code, for example. In this case, the information is also considered to comprise the code.

The inventors have recognized that by combining LAN based service discovery on a secure LAN with proximity discovery via radio broadcast using radio discovery codes, service-using devices are able to identify nearby service-providing devices in a large local area network, while the security and privacy of the devices is ensured. Optimal operation of the discovery process, and thus the local area network, might require the sharing of sensitive information, e.g. printer availability (the availability of all printers for an extended time may indicate that no one is present in an office) and/or the presence of an expensive display device or 3D printer. Sharing this information openly, as is done in Bluetooth discovery, is not desirable.

In particular, the inventors have recognized that radio broadcasts are important to discover nearby devices, that a service-providing device (i.e. discoveree) should not divulge its characteristics to just any other device and that the discovery process should therefore not start with the discoveree's unencrypted radio broadcasts, as is done in Bluetooth. By splitting the discovery process in at least two parts, as is done in Proximity-based Services (ProSe), in which the first part comprises providing and obtaining a code corresponding to a desired service-providing device and the second part comprises transmitting and listening for a transmission of this code, this is avoided. The inventors have further recognized that by letting the first part of the discovery process take place on the secure local area network, the characteristics transmitted in this first part of the discovery process are not visible to any other device (the transmitted characteristics of the discoveree cannot be recognized by users outside the (V)LAN as the communication within the (V)LAN is secure, e.g. encrypted in VLANs), while the normal flexibility of the local area network is not sacrificed. By creating the radio discovery code in the secure local area network, involvement of a mobile communication network function (e.g. the ProSe function) in creating codes may be avoided and the local area network may be administered in a flexible manner.

Proximity-based Services (ProSe), specified currently (Stage 2; Release 14) in 3GPP TS 23.303 v14.1.0 (2016 December) may be used to implement the second part of the discovery process (WLAN/WiFi based solutions such as Wi-Fi Aware being one of the other options). Although the first part of the discovery process in ProSe ensures security and privacy of the devices as well, the assignment of ProSe codes via the operator network is not very efficient for use in/with LANs. With the current version of ProSe, a central ProSe Function in the communication network assigns ProSe Application Codes (PACs) or ProSe Query Codes and ProSe Response Codes to the entities in the network. The inventors use the notion that via the LAN, the discoverer already communicates directly with potential discoverees using the existing LAN discovery mechanisms. This possibility to directly communicate between discoverer and discoverees via the infrastructure is not something that the ProSe technology assumes (hence the involvement of a ProSe server in the operator network).

Said wireless transmission of said selected one or more codes may conform to a ProSe or Wi-Fi Aware message format, for example. Said codes are normally created in the secure local area network, e.g. by the service-providing devices. Said codes may include one or more ProSe Application Codes (comprising a temporary identity that corresponds to the ProSe Application ID Name), one or more ProSe Restricted Codes, one or more ProSe Response Codes, one or more ProSe Query Codes, one or more ProSe Application Masks (i.e. one or more applicable parts of temporary identities of ProSe Application Codes; used for partial matching) and/or one or more non-ProSe codes, for example. The ProSe Application Code(s) and/or the ProSe Application Mask may be part of a ProSe Discovery Filter, for example. Said wireless transmission may be a wireless broadcast of a ProSe Application Code, for example. The secure local area network may be a 5G LAN (see e.g. 3GPP TR 22.821), for example. The service-providing device may be a printer, beamer, camera, content server or smart board, for example.

Said at least one processor may be configured to use said at least one transmitter to transmit a query on said secure local area network, said query comprising requirements and requesting information about service-providing devices with characteristics meeting said requirements, and use said at least one receiver to receive said information about said one or more service-providing devices in response to said query. Said query and its response may conform to UPnP or Bonjour message formats, for example.

Said information about said one or more service-providing devices may provide details of said one or more service-providing devices or a reference to said details and said at least one processor may be configured to select said one or more of said received codes based on said provided details. This allows the service-using device to use an own algorithm or user input to further narrow down the initial set of service-providing devices. If the service-using device transmits a query comprising requirements, the provided details may include the characteristics that met the requirements, characteristics that did not meet the requirements and/or characteristics for which no requirements were specified (by choice or because this was not possible), for example.

Said information may comprise a further code for each of said one or more service-providing devices and said at least one processor may be configured to use said at least one transmitter to wirelessly broadcast one or more of said further codes corresponding to said selected one or more codes before using said at least one receiver to listen for wireless transmission of said selected one or more codes. In this case, said one or more codes may include one or more ProSe Response Codes and said one or more further codes may include one or more ProSe Query Codes, for example. This avoids the service-providing device having to frequently broadcast its code, as it only needs to transmit its code when it receives a broadcast of the further code (e.g. a ProSe Request Code). Thus, the one or more further codes are transmitted before the one or more codes are transmitted.

According to the invention, the second object is realized in that the service-providing device comprises at least one receiver, at least one transmitter, and at least one processor configured to obtain a code associated with said service-providing device, information comprising said code being transmitted over a secure local area network to a service-using device, said code not comprising characteristics of said service-providing device, use said at least one transmitter to wirelessly transmit said code, and use said at least one receiver to receive data from said service-using device in response to said wireless transmission. Said data is preferably received over said secure local area network. Said at least one processor may be configured to receive or create said code. Said code is normally created in said secure local area network, e.g. by the service-providing device.

Said at least one processor may be configured to use said at least one transmitter to transmit said information comprising said code over said secure local area network to said service-using device.

Said at least one processor may be configured to use said at least one receiver to receive a query, said query comprising requirements and requesting information about service-providing devices with characteristics meeting said requirements, and use said at least one transmitter to transmit said information comprising said code in response to said query in dependence on said service-providing device having characteristics meeting said requirements. The query may be received and processed by the service-providing device itself, thereby avoiding the need to use a local server. This direct connection between service-using device and service-providing device allows efficient distribution of the (radio discovery) codes.

Said at least one processor may be configured to determine a source address associated with said query, associate said source address with said code in a memory, and obtain said source address associated with said code from said memory upon receiving data transmitted in response to said wireless transmission of said code. This allows the service-providing device to check whether the service-using device transmitting the data transmitted a query recently and acquired the code in the proper manner, for example.

Said at least one processor may be configured to include details of said service-providing device or a reference to said details in said information before using said at least one transmitter to transmit said information.

According to the invention, the third object is realized in that the method of discovering a service-providing device comprises receiving information about one or more service-providing devices located on a secure local area network over said secure local area network, said information comprising a code for each of said one or more service-providing devices, selecting one or more of said received codes, listening for wireless transmission of said selected one or more codes, and transmitting data to a device which wirelessly transmitted at least one of said selected one or more codes. Said method may be performed by software running on a programmable device. This software may be provided as a computer program product.

According to the invention, the fourth object is realized in that the method of enabling discovery of a service-providing device comprises obtaining a code associated with a service-providing device located on a secure local area network, said code being transmitted over said secure local area network to a service-using device, said code not comprising characteristics of said service-providing device, wirelessly transmitting said code at said service-providing device, and receiving data from said service-using device at said service-providing device in response to said wireless transmission. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving information about one or more service-providing devices located on a secure local area network over said secure local area network, said information comprising a code for each of said one or more service-providing devices, selecting one or more of said received codes, listening for wireless transmission of said selected one or more codes, and transmitting data to a device which wirelessly transmitted at least one of said selected one or more codes.

A non-transitory computer-readable storage medium stores at least a second software code portion, the second software code portion, when executed or processed by a computer, being configured to perform executable operations comprising: obtaining a code associated with a service-providing device located on a secure local area network, said code being transmitted over said secure local area network to a service-using device, said code not comprising characteristics of said service-providing device, wirelessly transmitting said code at said service-providing device, and receiving data from said service-using device at said service-providing device in response to said wireless transmission.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
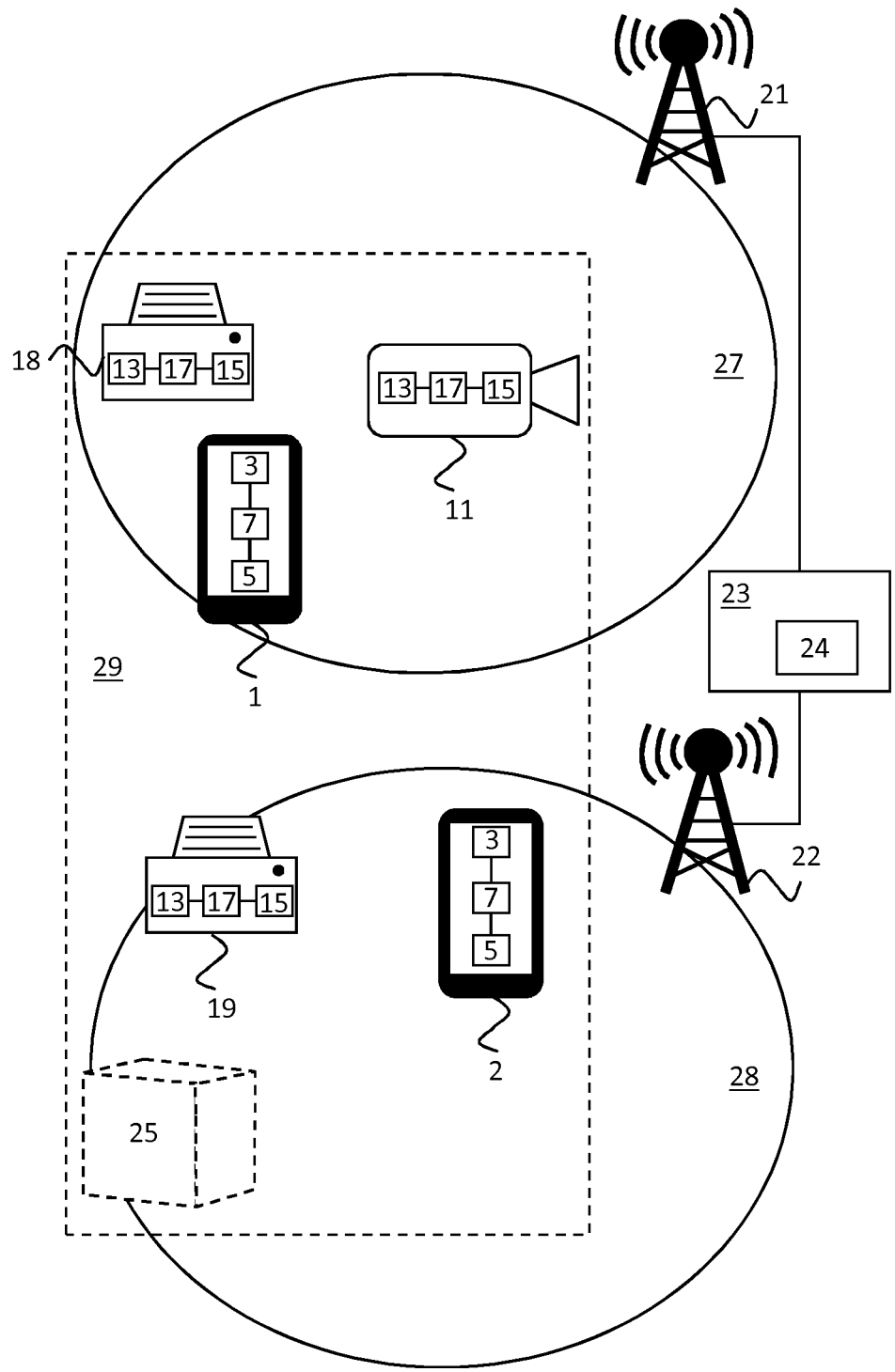
FIG. 1 is a block diagram of embodiments of the service-using and service-providing devices of the invention in an embodiment of a system.

FIG. 1 shows a first embodiment of a system comprising embodiments of the service-using and service-providing devices of the invention: both video camera 11 and printers 18 and 19 are providing services and mobile devices 1 and 2 are able to use these services. Examples of other service-providing devices are smart boards, beamers and displays. In the embodiment shown in FIG. 1, these service-using and service-providing devices are part of a 5G LAN 29. An 5G LAN is a managed and secure network that interconnects devices (also referred to as UEs or User Equipment). These devices are considered to be part of the LAN. An example of a 5G LAN is a private domain or virtual LAN within a home or enterprise environment. The access to the 5G LAN can be managed such that it is allowed solely to devices used by a specific group of people e.g. employees, guests, visitors.

The elements of a 5G LAN need not be located in the same physical location. Example are worldwide campuses for multinational companies, they can be part of the same private domain, or all the devices belonging to a family, whether they are at work, school, or at home. The 5G LAN 29 comprises devices in two distinct, non-adjacent spatial areas 27 and 28, which are serviced by base stations 21 and 22, respectively. The base stations 21 and 22 may be next generation NodeBs (gNBs), for example. Printers 18 and 19 are not only located in distinct spatial areas, but they also are different types of printers and possess distinct features and functionalities in the example of FIG. 1. Service-providing devices could also be located in the same spatial area and/or possess the same features and functionalities.

The mobile devices 1 and 2 each comprise a receiver 3, a transmitter 5 and a processor 7. The processor 7 is configured to use the receiver 3 to receive information about one or more of the printers 18 and 19 and the video camera 11 over the 5G LAN 29. The information comprises a code for each of these one or more service-providing devices. The processor 7 is further configured to select one or more of the received codes, use the receiver 3 to listen for wireless transmission of the selected one or more codes, and use the transmitter 5 to transmit data to a device which wirelessly transmitted at least one of the selected one or more codes.

The printers 18 and 19 and the video camera 11 each comprise a receiver 13, a transmitter 15 and a processor 17. The processor 17 is configured to obtain a code associated with the service-providing device that comprises the processor 17. Information comprising the code is transmitted over the 5G LAN 29 to a service-using device, i.e. mobile device 1 and/or 2. The code does not comprise characteristics of the service-providing device. The processor 17 uses the transmitter 15 to wirelessly transmit the code and use the receiver 13 to receive data from the mobile device 1 and/or the mobile device 2 in response to the wireless transmission.

Since the mobile devices 1 and 2 only receive wireless transmissions from nearby service-providing devices, the mobile devices 1 and 2 are able to discover a service-providing device that is nearby. For example, mobile device 1 is able to find out that printer 18 and video camera 1 are nearby and mobile device 2 is able to find out that printer 19 is nearby.

The base stations 21 and 22 are connected to a 5G core network 23. The base stations 21 and 22 may be connected to a ProSe Function 24 of the core network 23. The ProSe Function 24 is a 5G network element in charge of coordination of proximity services among the devices. The invention prevents the need to use the ProSe Function 24 to create ProSe codes, but the ProSe Function 24 may still be used for assigning radio parameters (e.g. frequency band) to be used in a particular ProSe Direct Communication in a licensed spectrum. Discoveree(s) (e.g. a printer) and discoverer could also agree on where they are going to broadcast (or where they are going to listen) as part of the 5G LAN discovery procedure. The printers 18 and 19 and the video camera 11 may obtain authorization from the ProSe Function 24 to wirelessly transmit the code via ProSe direct communication in the licensed spectrum.

Alternatively, the printers 18 and 19 and the video camera 11 may use unlicensed spectrum for ProSe communication or may use spectrum dedicated to ProSe (public safety or automotive), for example. This scenario falls under the ProSe Discovery procedures when not "served by E-UTRAN" [TS 23.303 and TS 36.331]. In this case, the printers 18 and 19 and the video camera 11 do not need to obtain authorization from the Prose Function 24. Alternatively, the printers 18 and 19 and the video camera 11 may use WLAN/WiFi based solutions such as Wi-Fi Aware instead of ProSe communication to wirelessly transmit the code, for example. In both cases, the ProSe Function 24 is not required for assigning the radio parameters and is therefore not required at all. Wi-Fi aware may be used in a 5G LAN, but could alternatively be used in a Wi-Fi LAN (infrastructure mode), for example. In the latter case, the base stations would be replaced with Wi-Fi access points.

In the embodiment shown in FIG. 1, the service-providing devices comprise one processor 17. In an alternative embodiment, one or more of the service-providing devices comprise multiple processors. The processor 17 may be a general-purpose processor, e.g. an ARM processor, or an application-specific processor, for example. The processor 17 may comprise multiple cores, for example. The processor 17 may run a Unix-based operating system, for example. The receiver 13 and the transmitter 15 may use one or more cellular communication technologies such as GPRS, CDMA, UMTS, LTE and/or 5G RAN to communicate with the base stations 21 and 22, for example. The receiver 13 and the transmitter 15 may use one or more wireless communication technologies such as Wi-Fi (IEEE 802.11) or LTE D2D to communicate with the mobile devices 1 and 2, for example. The receiver 13 and the transmitter 15 may be combined in a transceiver. The service-providing devices may comprise other components typical for a service-providing device, e.g. a power supply.

In the embodiment shown in FIG. 1, the service-using devices comprises one processor 7. In an alternative embodiment, one or more of the service-using devices comprises multiple processors. The receiver 3 and the transmitter 5 may use one or more cellular communication technologies such as GPRS, CDMA, UMTS, LTE and/or 5G RAN to communicate with the base stations 21 and 22, for example. The receiver 3 and the transmitter 5 may be combined in a transceiver. The processor 7 may be a general-purpose processor, e.g. an ARM processor, or an application-specific processor. The processor 7 may run Google Android or Apple iOS as operating system, for example. The service-using devices may comprise other components typical for a service-using device, e.g. a display and a battery.

Figure 2:
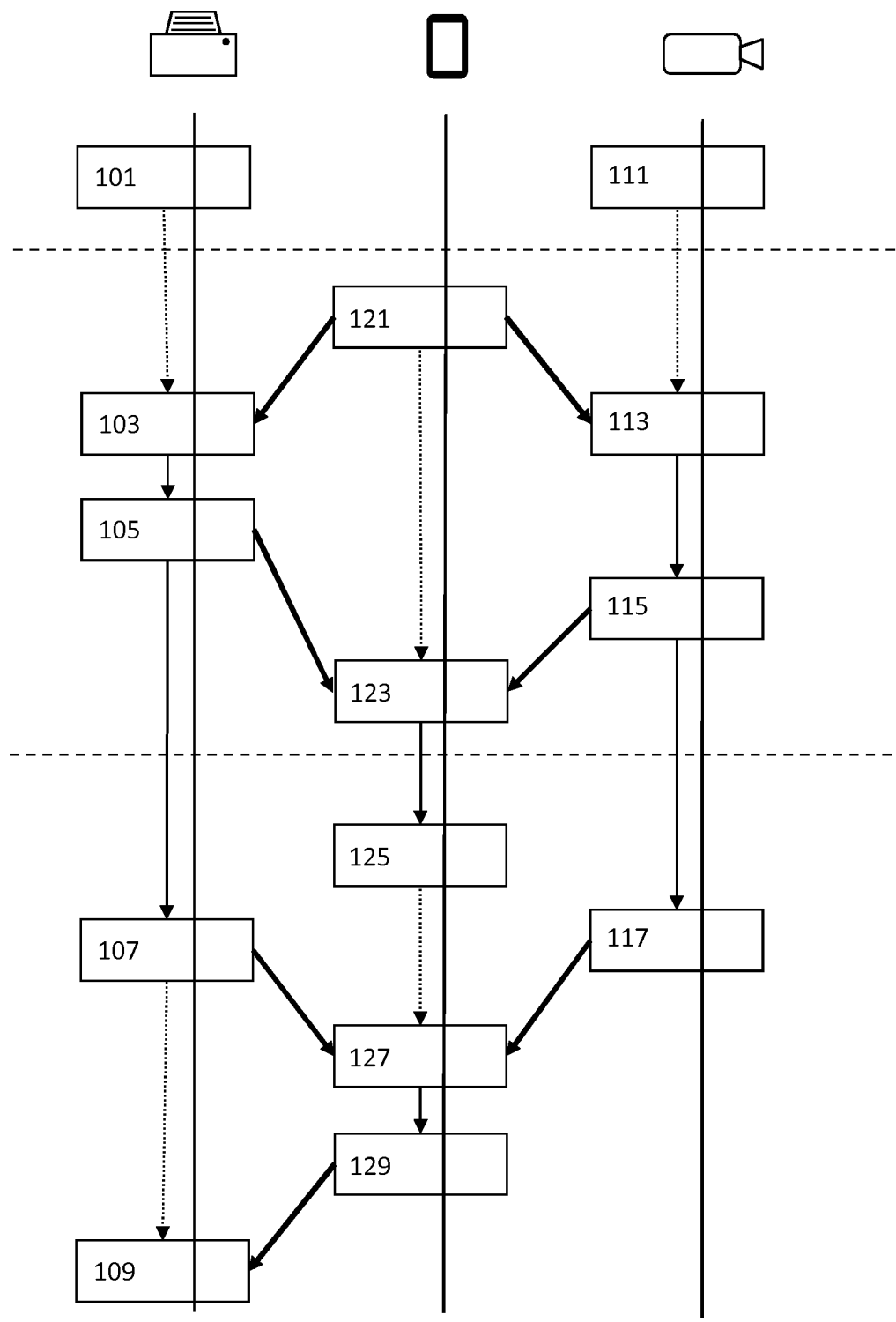
FIG. 2 is a first example of a flow diagram of first embodiments of the methods of the invention.

A first embodiment of the methods of the invention is shown in FIG. 2. Steps 101 and 111 comprise service-providing devices (discoverees) located on a secure local area network, in this example a 5G LAN, each obtaining a (radio discovery) code associated with the corresponding service-providing device. The radio discovery codes do not comprise characteristics of the service-providing devices. In the embodiment of FIG. 2, the service-providing devices create these codes themselves. The code may be a ProSe Application Code, a ProSe Application Mask or a ProSe Restricted Code, for example.

These codes may be generated by each service-providing device itself according to an algorithm that is known to all devices within the 5G LAN. The Radio Discovery Code (RDC) generation algorithm should prevent generation of the same RDC on different devices. If ProSe would be used, this code generation would not be coordinated by ProSe Function as it commonly would.

Devices not on the 5G LAN may be able to intercept the code when broadcast over the radio interface, but as they cannot do the preceding discovery on the 5G LAN they will not know what it refers to. The code may be generated dedicatedly for a service-using device transmitting a discovery query [restricted discovery], or the same code may be used for all service-using devices that do a 5G LAN discovery. The code is preferably a temporary code that is refreshed regularly. For example, the codes may come with validity times i.e. time-to-live. When the time-to-live has expired the service-using devices have to obtain new codes.

A step 121 comprises a service-using device transmitting a (discovery) query on the secure local area network. The query comprises requirements and requesting information about service-providing devices with characteristics meeting the requirements. Steps 103 and 113 comprise the service-providing devices receiving the query from the service-using device. The requirements may specify a particular device type (e.g. printer), a particular capability/service (e.g. color printing or black and white printing) or specific features of printers (e.g. staple, collate or book format). In the example of FIG. 2, the requirements specify that the device should be an imaging device (e.g. a printer or a camera).

The service-using device broadcasts the discovery query for a (specific type of) device in the 5G LAN. Non-3GPP (e.g. UPnP) discovery protocols may be used for this purpose. Exploiting such protocols makes the discovery method proposed in this document backwards compatible. Any non-3GPP discovery protocol that works on a LAN may be used, as long as the protocol can be used to also distribute a discovery code as one of the parameters.

Steps 105 and 115 comprise the service-providing devices transmitting information comprising their code over the secure local area network in response to the query in dependence on the service-providing device having characteristics meeting the requirements. In the example of FIG. 2, both service-providing devices have characteristics meeting the requirements. Step 123 comprises the service-using device receiving the information from the service-providing devices. In the embodiment of FIG. 2, the information includes details of the service-providing device or a reference to these details.

All the devices that satisfy the search query may respond with a non-3GPP response message. This message could contain numerous details on the device's features (e.g. ID, type, specific features, properties). This part of the response message is referred to as 'basic' message. There are various possibilities to organize this message e.g: a) a device sends solely the essential properties (e.g. ID, type) together with an URL to the location wherefrom the remaining details could be extracted; b) a device sends all 'basic' details in one message. The radio discovery code might be included in the essential properties or in another part of the basic message. While only service-providing devices that do support radio discovery codes are depicted in FIGS. 1 and 2, service-providing devices that do not support radio discovery codes may also respond to the query and may also use the same non-3GPP response message (but without the radio discovery code(s).

A step 125 comprises the service-using device selecting one or more of the received codes based on the received details. In the example of FIG. 2, the service-using device selects the code corresponding to the first service-providing device. In the example of FIG. 2, the service-using device requested information on available imaging devices and selected the printer based on the details, which specified the type of the image device. This allows the service-using device to select service-providing devices based on requirements that it is not able to specify in a query. As another example, if it is not possible to find a desired printer by specifying a particular device type (e.g. printer), a particular capability/service (e.g. color printing or black and white printing) or specific features of printers (e.g. staple, collate or book format) in a query, it may still be possible to select the desired printer if these characteristics are included in the details.

A step 127 comprises the service-using device listening for wireless transmission of the selected code. Steps 107 and 117 comprises the service-providing devices wirelessly broadcasting their code. Steps 107 and 117 may be repeated several times to ensure that the service-using device receives the code. Step 127 further comprises the service-using device receiving the codes from the service-providing devices.

The radio broadcast used at this phase of the proximity discovery can be intercepted by any device in the vicinity i.e. within radio reach of the service-providing device. However, this radio broadcast does not comprise any sensitive information. The service-providing devices and service-using device could make use of radio parameters (e.g. frequency bands) for the case when a device is "not served by E-UTRAN" [3GPP TS 23.303] in steps 107,117 and 127. Alternatively, the service-providing devices and the service-using device could agree on where they are going to broadcast (or where they are going to listen) as part of the 5G LAN discovery procedure.

A step 129 comprises the service-using device transmitting data to the first service-providing device, whose code was selected in step 125 and received in step 127. A step 109 comprises the first service-providing device receiving this data from the service-using device. At this stage, the service-using device has identified the most suitable device he was looking for in his vicinity. By using ProSe Direct Communication or 5G LAN communication, for example, the user can now communicate (transfer the data) to the targeted service-providing device.

Figure 3:
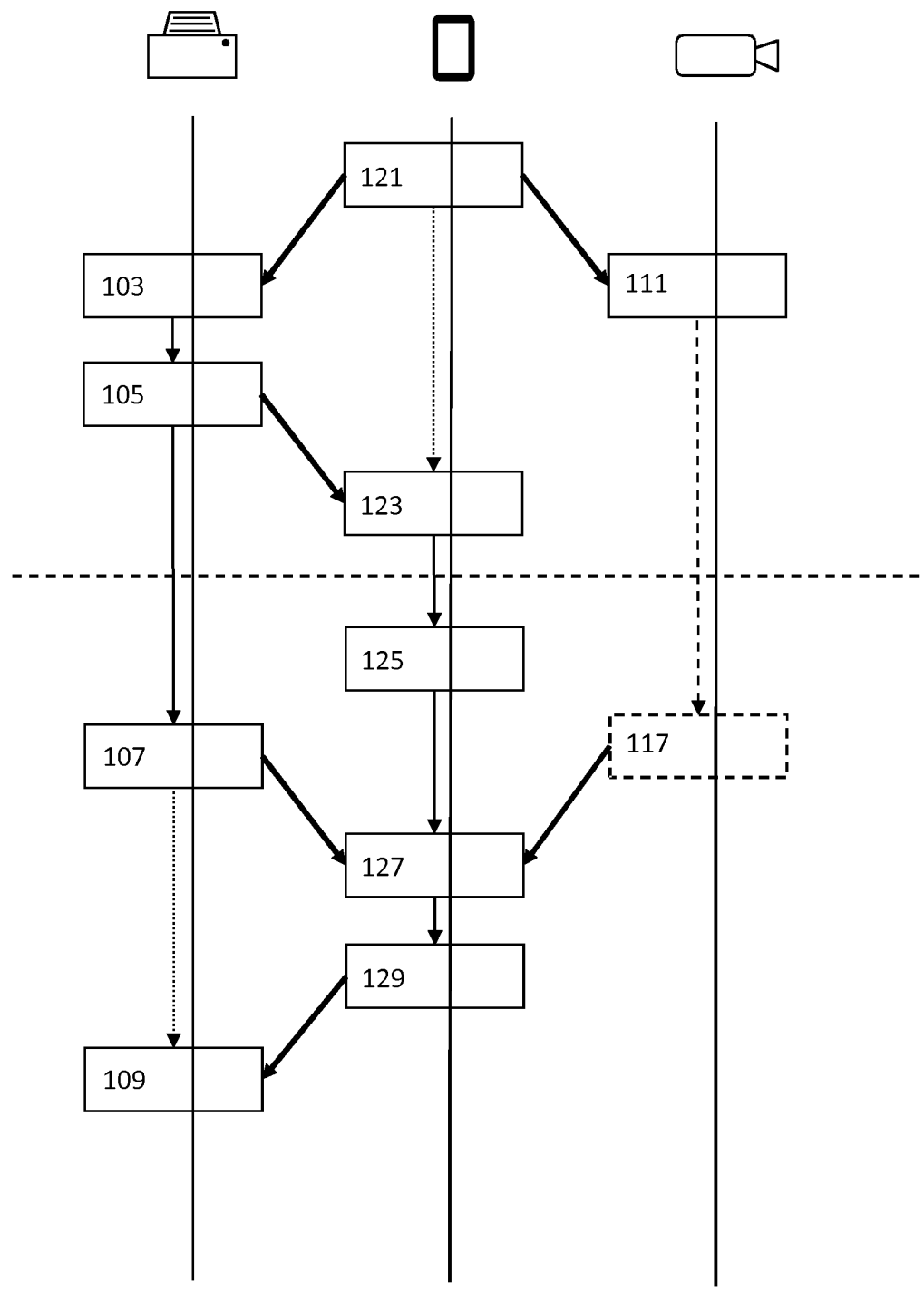
FIG. 3 is a second example of a flow diagram of the first embodiments of the methods of the invention.

While in the example of FIG. 2, both service-providing devices have characteristics meeting the requirements of the service-using device, in the example of FIG. 3, only the first service-providing device has characteristics meeting the requirements of the service-using device. The second service-providing therefore does not transmit information in response to the query (step 115 is omitted). In the example of FIG. 3, step 125 comprises selecting the only service-providing device from which information was received.

The second service-providing device may wireless transmit its code in step 117 independent of whether it has received a query. In an alternative embodiment, the service-providing device only wirelessly transmits its code, i.e. performs step 117, if it responded to a query.

Figure 4:
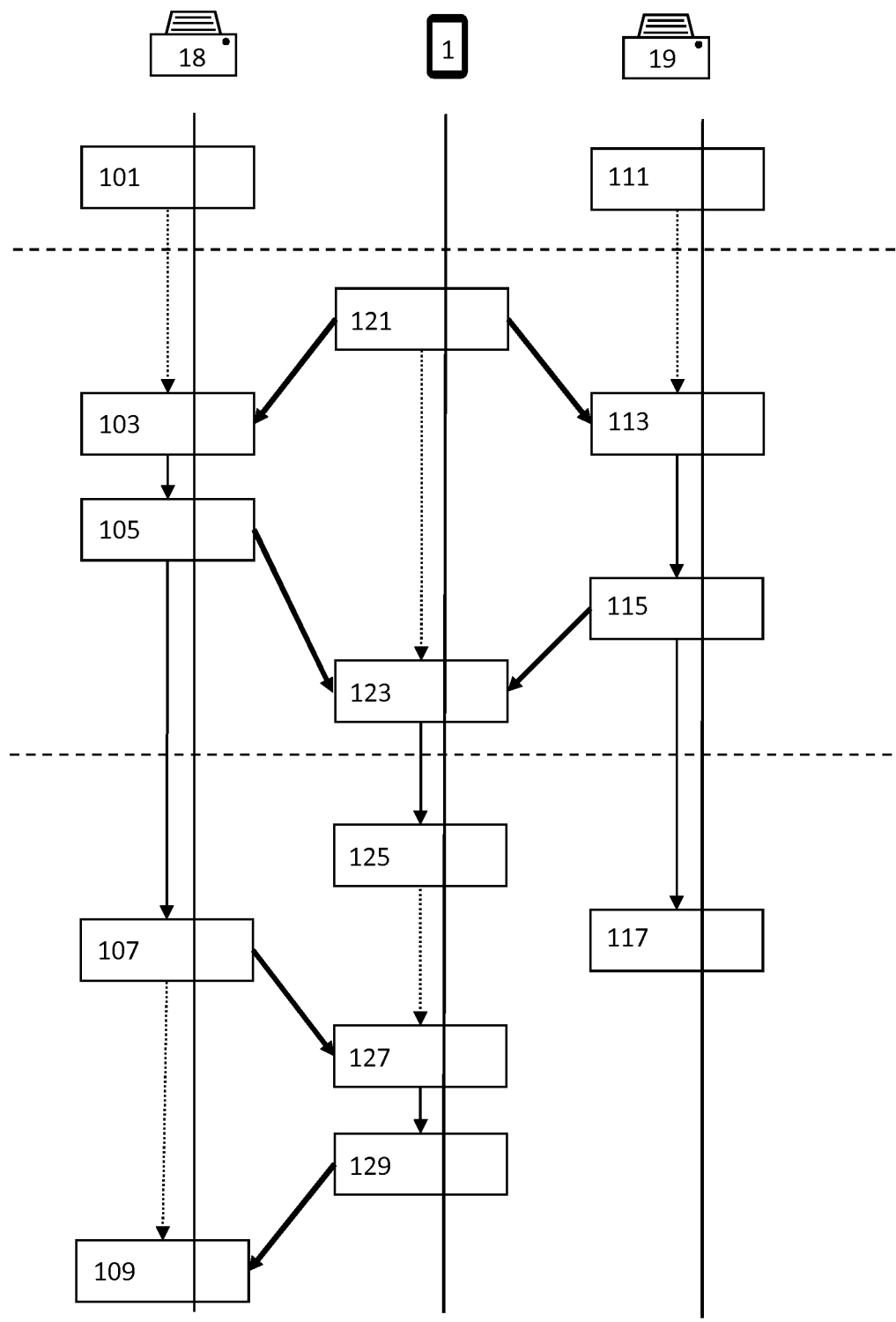
FIG. 4 is a third example of a flow diagram of first embodiments of the methods of the invention.

In the example of FIG. 4, the service-using device is mobile device 1 of FIG. 1 and the service-providing devices are printers 18 and 19 of FIG. 1. With the responses received from the printers 18 and 19 in step 123, the mobile device 1 creates a sub-set of the printers on the 5G LAN with their codes that comply to its requirements e.g. a list of printers that can print in color, on A4 and can staple the pages. If ProSe is used, the mobile device 1 may listen to ProSe enabled printers that broadcast their ProSe Application Code (PAC). If the mobile device 1 receives a PAC that is in its list (e.g. matches its ProSe filter), then it has discovered a nearby printer (or possibly multiple nearby printers). The mobile device 1 can then make use of that printer either using ProSe direct communication, or by communicating with the printer via the 5G LAN (i.e. via the gNB).

In the example of FIG. 1, only printer 18 is located near mobile device 1 and the code broadcast by the printer 19 in step 117 is therefore not received by the mobile device 1 in step 127. If the mobile device 1 had selected both printers in step 125, it would listen to codes corresponding to both printers in step 127, but only receive the code corresponding to printer 18 in step 127. Mobile device 1 would then transmit data, e.g. a document, to printer 18 in step 129.

Figure 5:
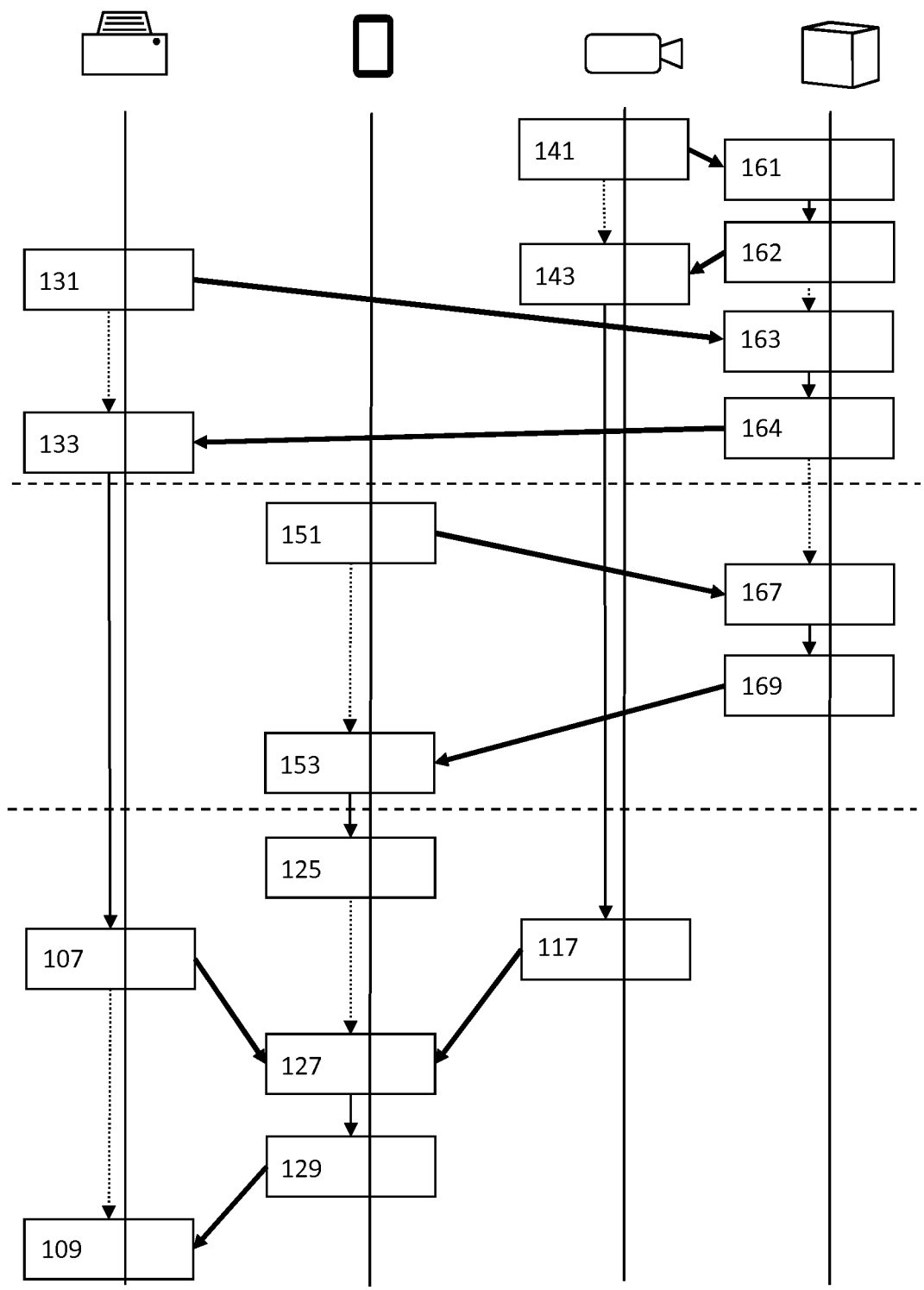
FIG. 5 is a flow diagram of second embodiments of the methods of the invention with a second example.

In the embodiment of FIGS. 2 to 4, the service-providing devices created their own codes. In the embodiment of FIG. 5, a central entity, e.g. a server in the secure local area network, creates the codes for the service-providing devices. In step 141, the second service-providing device transmits a request for a code to the central entity. In step 161, the central entity receives the request from the second service-providing device. In step 162, the central entity creates the code and transmits it to the second service-providing device. In step 143, the second service-providing device receives its code from the central entity.

In step 131, the first service-providing device transmits a request for a code to the central entity. In step 163, the central entity receives the request from the first service-providing device. In step 164, the central entity creates the code and transmits it to the first service-providing device. In step 133, the first service-providing device receives its code from the central entity.

In step 167, it is the central entity that receives the query, described in relation to FIG. 2, transmitted by the service-using device in step 151 over the secure local area network. The query may be transmitted specifically (unicast) to the central entity by the service-using device or may be broadcast by the service-using device. In the embodiment of FIG. 5, the service-providing devices do not transmit their code over the secure local area network themselves.

In step 169, the central entity sends a response to the query to the service-using device. The service-using device receives this response in step 153. In the example of FIG. 5, this response comprises the codes of both service-providing devices. The central entity only sends the codes of devices fulfilling the requirements in the query coming from the service-using device. The central entity is aware of the characteristics of the service-providing devices and sends these along with the codes so that the service-using device can make a selection. The steps that follow step 153 have been described in relation to FIG. 2.

Figure 6:
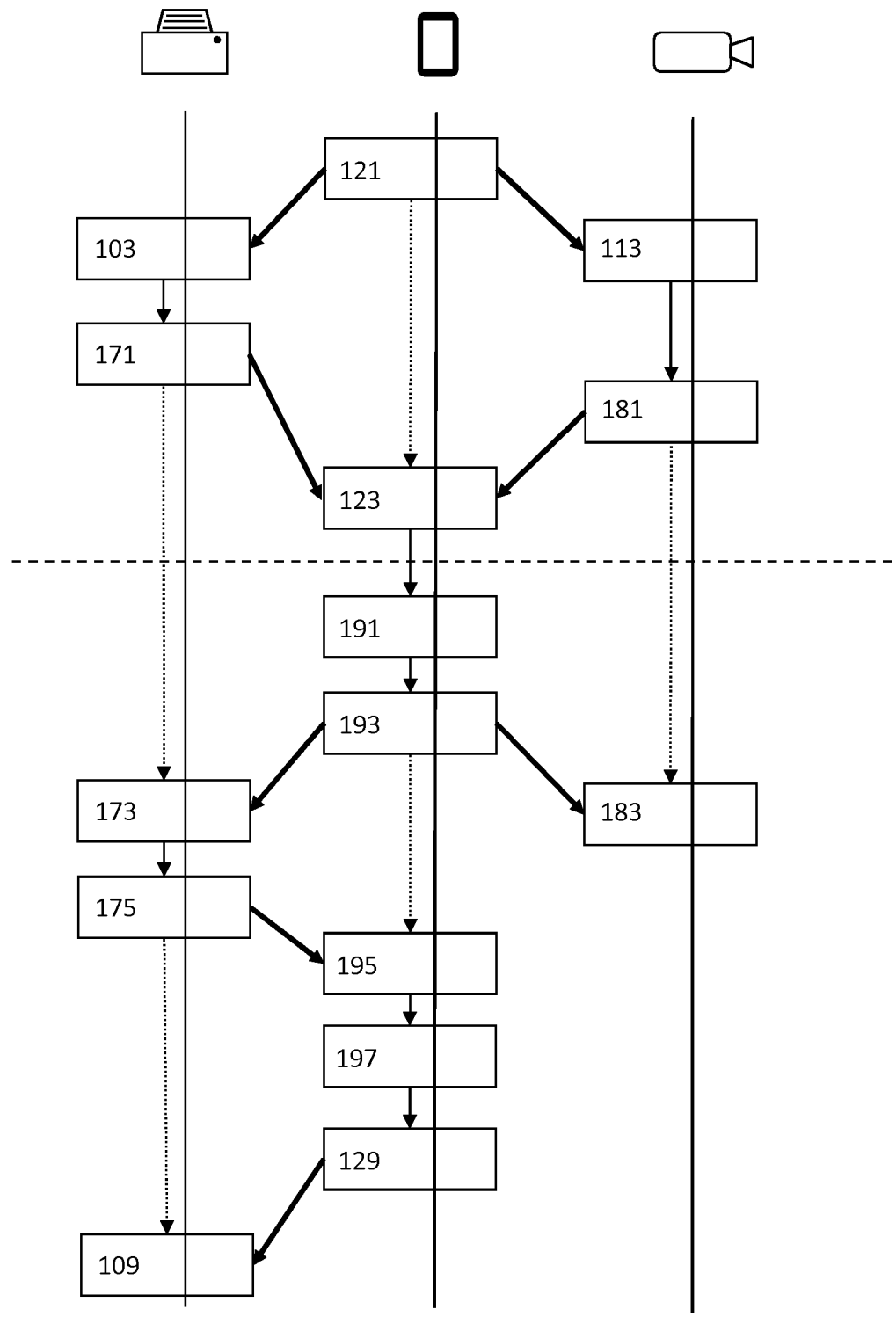
FIG. 6 is a flow diagram of third embodiments of the methods of the invention.

In the embodiments of FIGS. 2 to 5, the service-providing devices each wirelessly transmit (broadcast in these embodiments) a code (steps 107 and 117) to which the service-using device may respond by transmitting data (step 129). In the embodiment of FIG. 6, a further code is wirelessly transmitted. This further code is broadcast by the service-using device. A service-providing device may respond to this further code by transmitting the (first) code. While this (first) code was broadcast in the embodiments of FIGS. 2 to 5, it may be unicast or broadcast in the embodiment of FIG. 6. This code may be a ProSe Application Code in the embodiments of FIGS. 2 to 5 and a ProSe Response Code in the embodiment of FIG. 6, for example. The further code broadcast by the service-using device may be a ProSe Query Code, for example.

In the embodiment of FIG. 6, the service-providing devices each create two codes and transmit these two codes to the service-using device in steps 171 and 181, respectively. The service-using device receives the codes in step 123. As mentioned above, the two codes may include a ProSe Response Code and a ProSe Query Code, for example. Step 171 and 181 may further comprise determining a source address associated with the query and associating the source address in a memory with a code returned to the service-using device.

The two codes corresponding to the first service-providing device are selected in step 191. One of them is selected for use in step 193. In step 193, this code, e.g. a ProSe Query Code, is wirelessly broadcast. In steps 173 and 183, the two service-providing devices receive this code. Since this code corresponds to (the code created and provided by) the first service-providing device, only the first service-providing transmits a response to the service-using device.

In step 175, the first service-providing device transmits a response that includes the other of the two codes, e.g. a ProSe Response Code. In step 195, the service-using device receives this response from the first service-providing device. If the service-using device would not have received any code in step 195, it would know that most likely, no device matching its requirements is nearby. In step 197, the service-using device checks whether this code corresponds to the code it transmitted in step 193, e.g. whether the ProSe Response Code received in step 195 matches (is associated with) the ProSe Query Code broadcast in step 193.

Step 129 comprises the service-using device transmitting data to the first service-providing device. Step 109 comprises the first service-providing device receiving this data from the service-using device. Before the first service-providing devices processes the received data, it may first obtain the source address that it associated with the code in step 171 from the memory. The service-providing device may be configured to compare this with the source address of the received data and only process the received data if the source addresses match.

In the embodiment of FIG. 6, the service-providing devices create and provide their codes themselves. In a variation on the embodiment of FIG. 6, a central entity creates and provides the codes, as described in relation to steps 131-133, 141-143 and 161-164 of FIG. 5.

Figure 7:
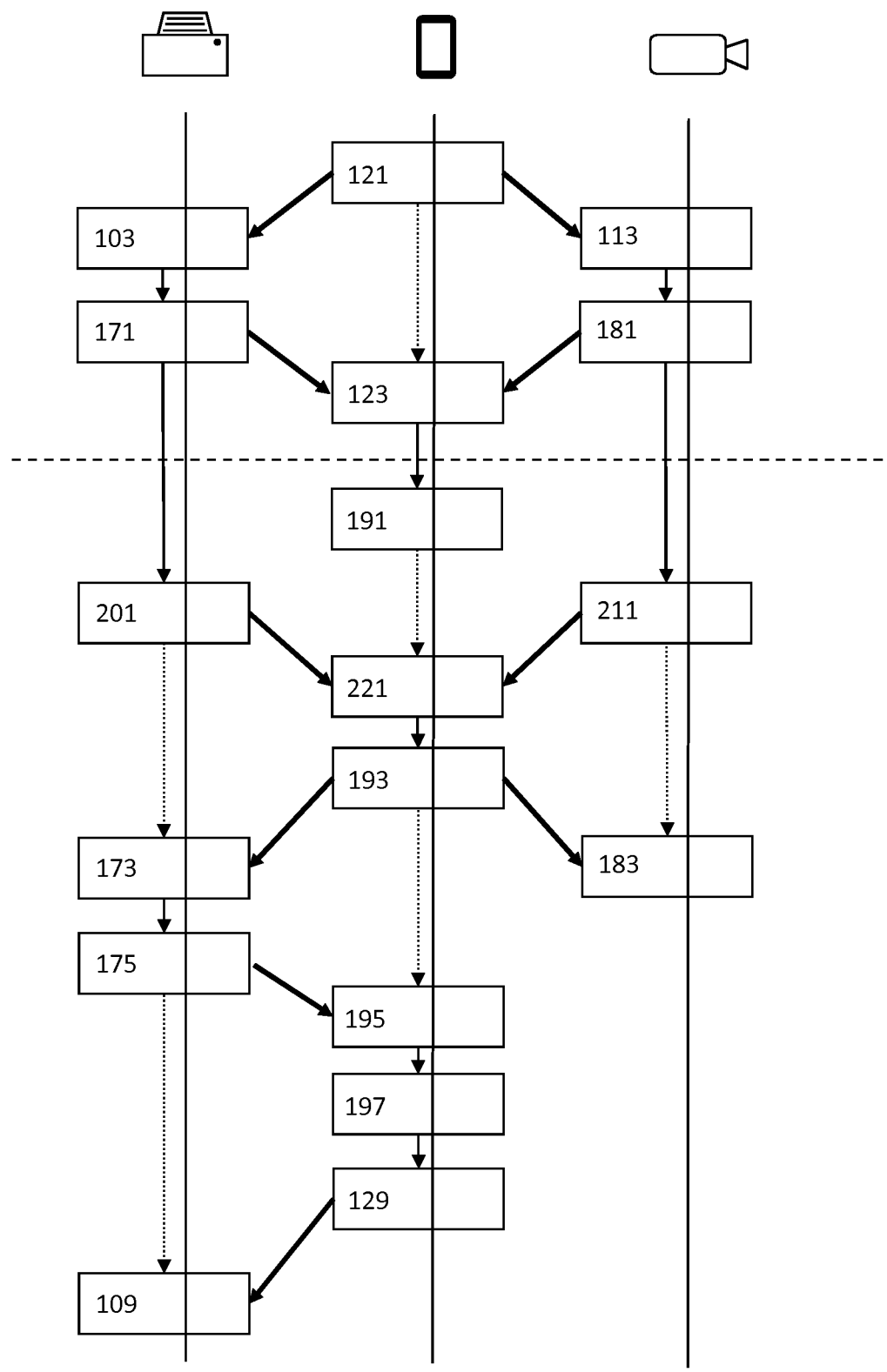
FIG. 7 is a flow diagram of fourth embodiments of the methods of the invention.

In the embodiment of FIG. 6, the service-using device immediately started broadcasting a first code, e.g. a ProSe Query Code, in step 193 after it had selected this code in step 191. In the embodiment of FIG. 7, the service-using device first waits in step 221 until it receives a broadcast comprising the selected code from a service-providing device. The first and second service-providing devices start broadcasting their first code in steps 201 and 211, respectively, upon transmitting their code to the service-using device in steps 171 and 181, respectively. In other words, the service-providing devices start looking for the service-using device that transmitted the query. In the example of FIG. 7, both service-providing devices have characteristics meeting the requirements, but only the first service-providing device has been selected in step 125.

Only after the service-using device has received (in step 221) the code that it selected in step 191, will the service-using device broadcast this code in step 193. In the embodiment of FIG. 7, this selected code is received by both the first and second service-providing devices. Since the code received by the second service-providing device in step 183 does not correspond to (the code created and provided by) the second service-providing device, the second service-providing device does not take further action. Step 193 and the steps that follow step 193 have been described in relation to FIG. 6. In an alternative embodiment, the service-providing device does not broadcast the selected code in step 193, but transmits a unicast message requesting the first service-providing device to transmit the other of the two codes, e.g. the ProSe Response Code.

Figure 8:
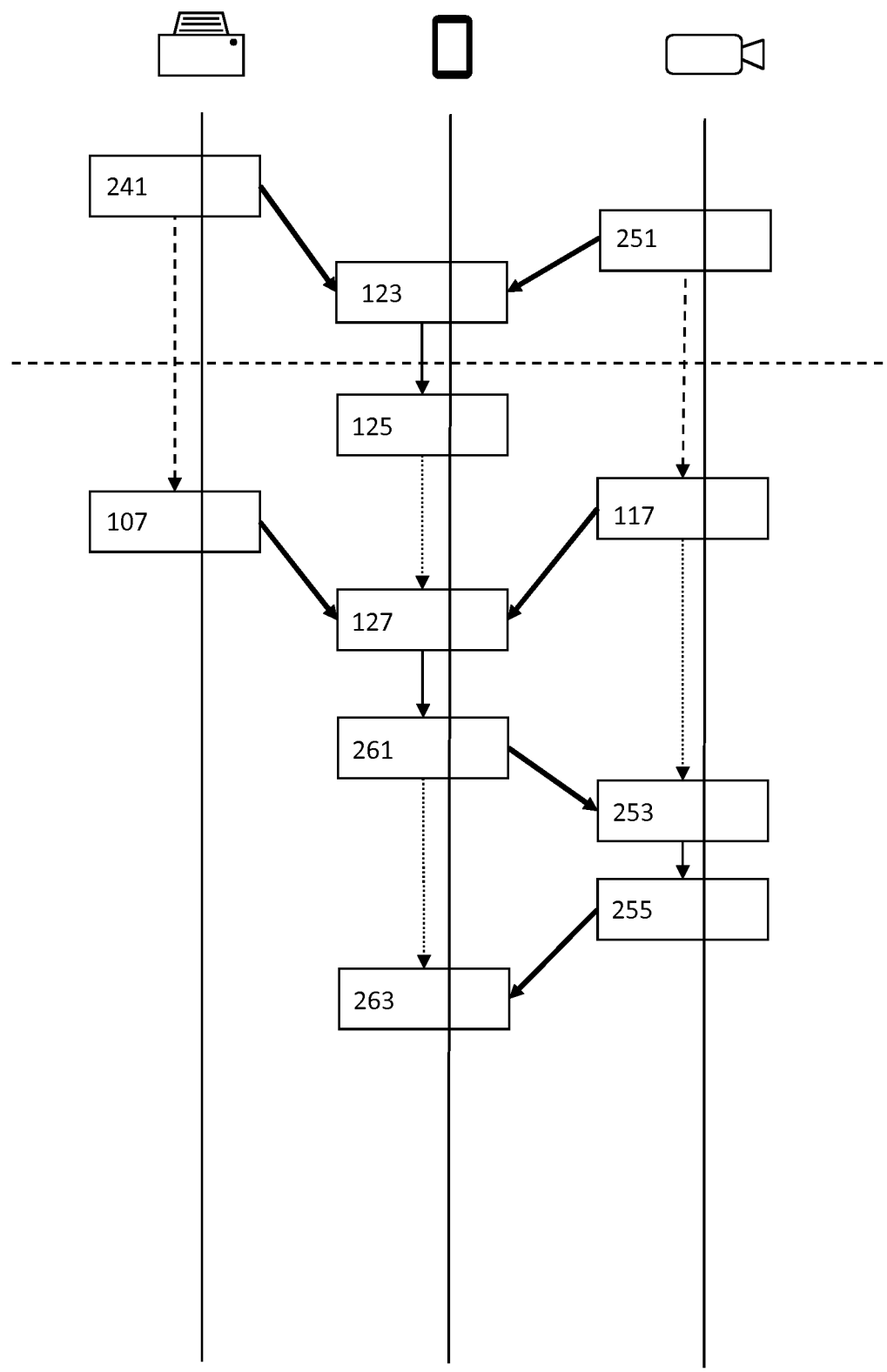
FIG. 8 is a flow diagram of fifth embodiments of the methods of the invention.

While in the embodiments of FIGS. 2-7, the service-using device transmits a query in order to receive information about service-providing devices, either from the service-providing devices themselves or from a central entity, in the embodiment of FIG. 8, which is a variant on the embodiment of FIGS. 2-4, the service-providing devices broadcast their codes and details over the secure local area network. The first and second service-providing devices do this in steps 241 and 251, respectively.

The service-using devices receive the information in step 123. In the embodiment of FIG. 8, many of the service-providing devices from which the service-using device receives information may not meet its requirements. In step 125, the service-using device can select one or more codes corresponding to one or more service-providing devices based on its requirements. In an alternative embodiment, a central entity broadcasts the codes and details of the service-providing devices. One of these principles may be used in variants on the embodiments of FIGS. 5-7 as well.

In the examples of FIGS. 2,3,5,6 and 7, the code corresponding to the first service-providing device is selected. In the example of FIG. 8, the code corresponding to the second service-providing device is selected. In step 261, the service-using device transmits data to the second service-providing device. In the example of FIG. 8, the second service-providing device is a source of data, e.g. a video camera. The data transmitted in step 261 therefore comprises a request to obtain further data, e.g. images, from the second service-providing device. The second service-providing device receives this request in step 253 and transmits the further data in step 255. The service-using device receives this further data in step 263.

Although only ProSe examples have been provided in the description of FIGS. 2 to 8, WLAN/WiFi based solutions such as Wi-Fi Aware may be used in a similar manner. When broadcasting a ProSe code, a device may need to obtain authorization from the network to broadcast this ProSe code unless unlicensed spectrum or spectrum dedicated to ProSe is used. If a WLAN/WiFi based solution is used (e.g. Wifi Aware), not only is it not necessary to obtain a ProSe code from the ProSe function, but it is also not necessary to obtain authorization to broadcast the radio discovery code In the telecommunications system 300 of FIG. 9, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

Figure 9:
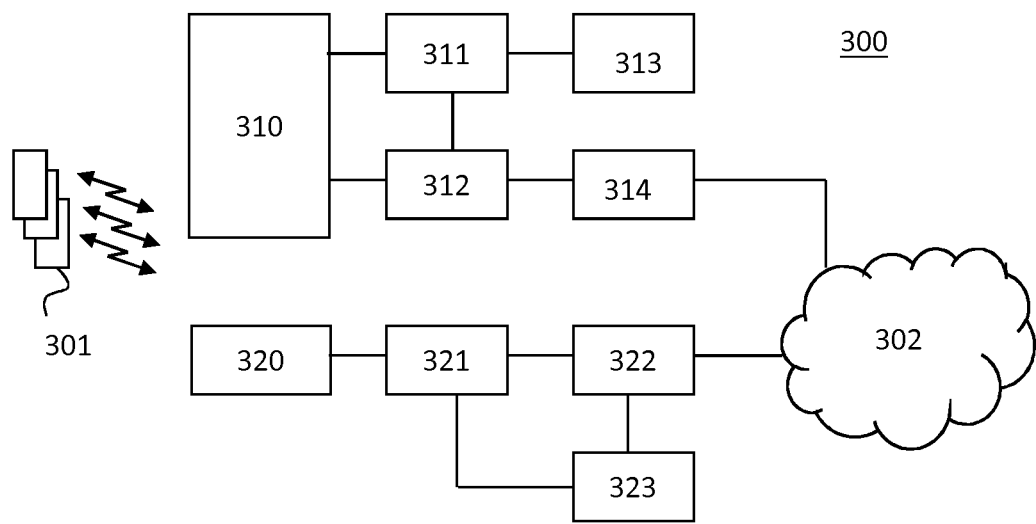
FIG. 9 is a block diagram of an exemplary cellular telecommunication system which may be part of the system of FIG. 1.

The lower branch of FIG. 9 represents a GSM/GPRS or UMTS network.

For a GSM/GPRS network, a radio access network (RAN) system 320 comprises a plurality of nodes, including base stations (combination of a BSC and a BTS), not shown individually in FIG. 9. The core network system comprises a Gateway GPRS Support Node 322 (GGSN), a Serving GPRS Support Node 321 (SGSN, for GPRS) or Mobile Switching Centre (MSC, for GSM, not shown in FIG. 9) and a Home Location Register 323 (HLR). The HLR 323 contains subscription information for user devices 301, e.g. mobile stations MS.

For a UMTS radio access network (UTRAN), the radio access network system 320 also comprises a Radio Network Controller (RNC) connected to a plurality of base stations (NodeBs), also not shown individually in FIG. 9. In the core network system, the GGSN 322 and the SGSN 321/MSC are connected to the HLR 323 that contains subscription information of the user devices 301, e.g. user equipment UE.

The upper branch of the telecommunications system in FIG. 9 represents a 4G network, commonly indicated as Long Term Evolution (LTE) system or Evolved Packet System (EPS).

The radio access network system 310 (E-UTRAN) of the EPS, comprises base stations (evolved NodeBs, eNodeBs or eNBs), not shown individually in FIG. 9, providing cellular wireless access for a user device 301, e.g. user equipment UE. The core network system comprises a PDN Gateway (P-GW) 314 and a Serving Gateway 312 (S-GW). The E-UTRAN 310 of the EPS is connected to the S-GW 312 via a packet network. The S-GW 312 is connected to a Home Subscriber Server HSS 313 and a Mobility Management Entity MME 311 for signalling purposes. The HSS 313 includes a Subscription Profile Repository SPR for user devices 301.

For GPRS, UMTS and LTE systems, the core network system is generally connected to a further packet network 302, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 10:
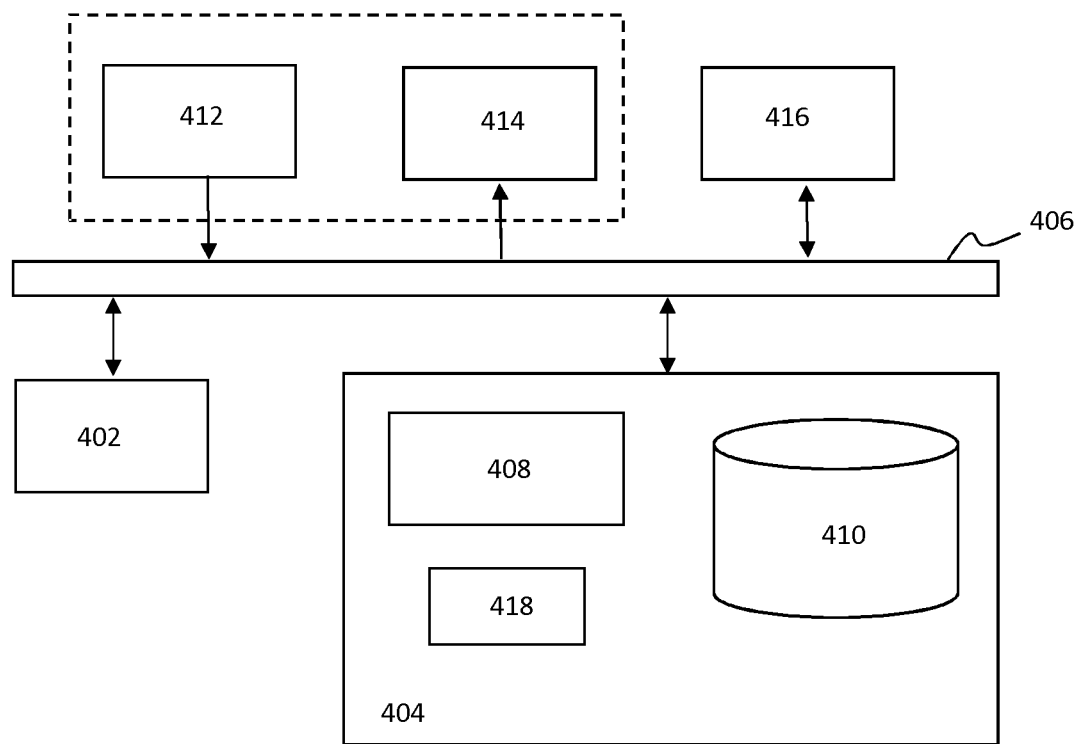
FIG. 10 is a block diagram of an exemplary data processing system for performing the methods of the invention.

FIG. 10 depicts a block diagram illustrating an exemplary data processing system that may perform the method as described with reference to FIGS. 2 to 8.

As shown in FIG. 10, the data processing system 400 may include at least one processor 402 coupled to memory elements 404 through a system bus 406. As such, the data processing system may store program code within memory elements 404. Further, the processor 402 may execute the program code accessed from the memory elements 404 via a system bus 406. In one aspect, the data processing system may be implemented as a computer that is suitable for storing and/or executing program code. It should be appreciated, however, that the data processing system 400 may be implemented in the form of any system including a processor and a memory that is capable of performing the functions described within this specification.

The memory elements 404 may include one or more physical memory devices such as, for example, local memory 408 and one or more bulk storage devices 410. The local memory may refer to random access memory or other non-persistent memory device(s) generally used during actual execution of the program code. A bulk storage device may be implemented as a hard drive or other persistent data storage device. The processing system 400 may also include one or more cache memories (not shown) that provide temporary storage of at least some program code in order to reduce the number of times program code must be retrieved from the bulk storage device 410 during execution.

Input/output (I/O) devices depicted as an input device 412 and an output device 414 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 412 and the output device 414). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 416 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 400, and a data transmitter for transmitting data from the data processing system 400 to said systems, devices and/or networks. Modems, cable modems, and Ethernet cards are examples of different types of network adapter that may be used with the data processing system 400.

As pictured in FIG. 10, the memory elements 404 may store an application 418. In various embodiments, the application 418 may be stored in the local memory 408, the one or more bulk storage devices 410, or separate from the local memory and the bulk storage devices. It should be appreciated that the data processing system 400 may further execute an operating system (not shown in FIG. 10) that can facilitate execution of the application 418. The application 418, being implemented in the form of executable program code, can be executed by the data processing system 400, e.g., by the processor 402. Responsive to executing the application, the data processing system 400 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 402 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A service-using device comprising:
   at least one receiver;
   at least one transmitter; and
   at least one processor configured to identify a nearby service-providing device in a secure local area network (LAN) by:
      using the at least one receiver to receive information about one or more service-providing devices located on the secure LAN using a LAN discovery procedure that (i) comprises a communication between the at least one receiver and the one or more service-providing devices over the secure LAN and (ii) occurs independently of a ProSe function, the information comprising a code for, and details on features of, each of the one or more service-providing devices, and the secure local area network being one of a 5G LAN or a VLAN,
      selecting one or more of the received codes,
      using the at least one receiver to listen for wireless transmission of the selected one or more codes, and
      using the at least one transmitter to transmit data to the service-providing device which wirelessly transmitted at least one of the selected one or more codes.

2. The service-using device as claimed in claim 1, wherein the information about the one or more service-providing devices provides details of the one or more service-providing devices or a reference to the details and the at least one processor is further configured to select the one or more of the received codes based on the provided details.

3. The service-using device as claimed in claim 1, wherein the at least one processor is further configured to use the at least one transmitter to transmit a query on the secure local area network, the query comprising requirements and requesting information about service-providing devices with characteristics meeting the requirements, and use the at least one receiver to receive the information about the one or more service-providing devices in response to the query.

4. The service-using device as claimed in claim 1, wherein the one or more codes are at least one of: one or more ProSe Application Codes, one or more ProSe Application Masks, or one or more ProSe Restricted Codes, and wherein the one or more codes are generated by the one or more service-providing devices.

5. The service-using device as claimed in claim 1, wherein the information comprises a further code for each of the one or more service-providing devices and the at least one processor is further configured to use the at least one transmitter to wirelessly broadcast one or more of the further codes corresponding to the selected one or more codes before using the at least one receiver to listen for wireless transmission of the selected one or more codes.

6. The service-using device as claimed in claim 5, wherein the one or more codes include one or more ProSe Response Codes and the one or more further codes include one or more ProSe Query Codes, and wherein the one or more codes and the one or more further codes are generated by the one or more service-providing devices.

7. The service-using device as claimed in claim 1, wherein the information is transmitted securely between the one or more service-providing devices and the at least one receiver using encryption provided by the secure LAN.

8. The service-using device as claimed in claim 1, wherein the communication between the at least one receiver and the one or more service-providing devices over the secure LAN comprises a direct communication between the at least one receiver and the one or more service-providing devices facilitated by the secure LAN.

9. A method of discovering a nearby service-providing device that is located in a secure local area network (LAN), the method comprising:
   receiving information about one or more service-providing devices located on the secure LAN using a LAN discovery procedure that (i) comprises a communication between a service-using device and the one or more service-providing devices over the secure LAN and (ii) occurs independently of a ProSe function, the information comprising a code for, and details on features of, each of the one or more service-providing devices, and the secure local area network being one of a 5G LAN or a VLAN;

selecting one or more of the received codes;

listening for wireless transmission of the selected one or more codes; and transmitting data to the service-providing device which wirelessly transmitted at least one of the selected one or more codes.

10. A non-transitory computer-readable medium having instructions stored thereon that, when executed by one or more processors of a computing device configured to identify a nearby service-providing device in a secure local area network (LAN), cause the computing device to carry out operations including:

receiving information about one or more service-providing devices located on the secure LAN using a LAN discovery procedure that (i) comprises a communication between the computing device and the one or more service-providing devices over the secure LAN and (ii) occurs independently of a ProSe function, the information comprising a code for, and details on features of, each of the one or more service-providing devices, and the secure LAN being one of a 5G LAN or a VLAN;

selecting one or more of the received codes;

listening for wireless transmission of the selected one or more codes; and transmitting data to the service-providing device which wirelessly transmitted at least one of the selected one or more codes.

11. A service-providing device located on a secure local area network (LAN) and comprising:

at least one receiver;

at least one transmitter; and at least one processor configured to:

obtain a code associated with the service-providing device, information comprising the code and details on features of the service-providing device being transmitted over the secure LAN to a service-using device using a LAN discovery procedure that (i) comprises a communication between the at least one transmitter and the service-using device over the secure LAN and (ii) occurs independently of a ProSe function, and the secure local area network being one of a 5G LAN or a VLAN, use the at least one transmitter to wirelessly transmit the code, and use the at least one receiver to receive data from the service-using device in response to the wireless transmission.

12. The service-providing device as claimed in claim 11, wherein the code is created in the secure local area network.

13. The service-providing device as claimed in claim 11, wherein the at least one processor is configured to:

use the at least one transmitter to transmit the information comprising the code over the secure local area network to the service-using device.

14. The service-providing device as claimed in claim 13, wherein the at least one processor is further configured to:

use the at least one receiver to receive a query, the query comprising requirements and requesting information about service-providing devices with characteristics meeting the requirements, and use the at least one transmitter to transmit the information comprising the code in response to the query in dependence on the service-providing device having characteristics meeting the requirements.

15. The service-providing device as claimed in claim 14, wherein the at least one processor is further configured to:

determine a source address associated with the query, associate the source address with the code in a memory, and obtain the source address associated with the code from the memory upon receiving data transmitted in response to the wireless transmission of the code.

16. The service-providing device as claimed in claim 13, wherein the at least one processor is further configured to include details of the service-providing device or a reference to the details in the information before using the at least one transmitter to transmit the information.

17. The service-providing device as claimed in claim 11, wherein the information is transmitted securely between the transmitter and the service-using device using encryption provided by the secure LAN.

18. The service-providing device as claimed in claim 11, wherein the communication between the at least one transmitter and the service-using devices over the secure LAN comprises a direct communication between the at least one transmitter and the service-using device facilitated by the secure LAN.

19. A method of enabling discovery of a service-providing device located on a secure local area network (LAN), the method comprising:

obtaining a code associated with the service-providing device, the code and details on features of the service-providing device being transmitted over the secure LAN to a service-using device using a LAN discovery procedure that (i) comprises a communication between the service-providing device and the service-using device over the secure LAN and (ii) occurs independently of a ProSe function, and the secure local area network being one of a 5G LAN or a VLAN;

wirelessly transmitting the code at the service-providing device; and receiving data from the service-using device at the service-providing device in response to the wireless transmission.

20. A non-transitory computer-readable medium having instructions stored thereon that, when executed by one or more processors of a computing device, cause the computing device to carry out operations including:

obtaining a code associated with a service-providing device located on a secure local area network (LAN), the code and details on features of the service-providing device being transmitted over the secure LAN to a service-using device using a LAN discovery procedure that (i) comprises a communication between the computing device and the service-using device over the secure LAN and (ii) occurs independently of a ProSe function, and the secure local area network being one of a 5G LAN or a VLAN;

wirelessly transmitting the code at the service-providing device; and receiving data from the service-using device at the service-providing device in response to the wireless transmission.

* * * * *